(12) United States Patent
Ramsey et al.

(10) Patent No.: US 7,827,061 B2
(45) Date of Patent: *Nov. 2, 2010

(54) DYNAMIC SELECTION OF OUTBOUND MARKETING EVENTS

(75) Inventors: Mark S. Ramsey, Colleyville, TX (US); David A. Selby, Nr Fareham (GB)

(73) Assignee: International Business Machines Corporation, Armonk, NY (US)

( * ) Notice: Subject to any disclaimer, the term of this patent is extended or adjusted under 35 U.S.C. 154(b) by 907 days.

This patent is subject to a terminal disclaimer.

(21) Appl. No.: 11/120,833

(22) Filed: May 3, 2005

(65) Prior Publication Data

US 2006/0253469 A1    Nov. 9, 2006

(51) Int. Cl.
*G06F 7/00* (2006.01)
*G06Q 30/00* (2006.01)

(52) U.S. Cl. .............. 705/14.43; 705/14.1; 705/14.13; 705/14.52; 705/14.53; 705/14.61; 705/14.66; 707/999.1

(58) Field of Classification Search .................... 705/14, 705/10, 14.1, 14.13, 14.43, 14.52, 14.53, 705/14.61, 14.66; 707/999.1
See application file for complete search history.

(56) References Cited

U.S. PATENT DOCUMENTS

| | | | | |
|---|---|---|---|---|
| 5,937,392 | A * | 8/1999 | Alberts ..................... | 705/14.52 |
| 6,233,566 | B1 * | 5/2001 | Levine et al. ............. | 705/36 R |
| 6,427,140 | B1 * | 7/2002 | Ginter et al. ................... | 705/80 |
| 6,484,163 | B1 * | 11/2002 | Lawrence et al. .............. | 707/3 |
| 6,519,571 | B1 * | 2/2003 | Guheen et al. ................ | 705/14 |
| 6,567,786 | B1 | 5/2003 | Bibelnieks et al. | |
| 6,839,680 | B1 * | 1/2005 | Liu et al. ..................... | 705/10 |
| 6,895,405 | B1 * | 5/2005 | Choi et al. .................. | 707/101 |
| 6,907,566 | B1 * | 6/2005 | McElfresh et al. .......... | 715/210 |
| 6,925,441 | B1 * | 8/2005 | Jones et al. .................... | 705/10 |
| 6,946,672 | B1 * | 9/2005 | Lapstun et al. .............. | 250/566 |
| 6,988,082 | B1 * | 1/2006 | Williams et al. ........... | 705/36 T |
| 6,993,493 | B1 * | 1/2006 | Galperin et al. ............... | 705/10 |
| 6,996,579 | B2 * | 2/2006 | Leung et al. ........................ | 1/1 |
| 7,014,110 | B2 * | 3/2006 | Minowa et al. ............. | 235/383 |
| 7,272,575 | B2 * | 9/2007 | Vega ........................... | 705/27 |
| 7,349,865 | B2 * | 3/2008 | Fergusson et al. ............. | 705/10 |
| 7,386,460 | B1 * | 6/2008 | Frank et al. ................. | 705/310 |

(Continued)

FOREIGN PATENT DOCUMENTS

WO    WO 9922328 A1    6/1999

(Continued)

*Primary Examiner*—James W Myhre
*Assistant Examiner*—Adam Chornesky
(74) *Attorney, Agent, or Firm*—Schmeiser, Olsen & Watts; Anna L. Linne

(57) ABSTRACT

A database system and method for ordering marketing events for offering to a candidate. The database system comprises a database manager software application, a first database structure storing a first list identifying marketing events, and a second database structure storing a second list of candidates. The database manager software application is stored on a computer readable medium. The database manager software application comprises an optimization tool. Each marketing event from the first list comprises a marketing offer and an identified channel means for communicating the marketing offer. The optimization tool is for optimizing and sorting, the marketing events from the first list for a first candidate from said second list.

31 Claims, 3 Drawing Sheets

U.S. PATENT DOCUMENTS

| | | | |
|---|---|---|---|
| 7,630,932 B2 * | 12/2009 | Danaher et al. | 705/38 |
| 2002/0004735 A1 * | 1/2002 | Gross | 705/10 |
| 2002/0038246 A1 * | 3/2002 | Nagaishi | 705/14 |
| 2002/0062247 A1 * | 5/2002 | Allen | 705/14 |
| 2002/0198775 A1 * | 12/2002 | Ryan | 705/14 |
| 2003/0023475 A1 * | 1/2003 | Fergusson et al. | 705/10 |
| 2003/0028451 A1 * | 2/2003 | Ananian | 705/27 |
| 2003/0120584 A1 * | 6/2003 | Zarefoss et al. | 705/37 |
| 2003/0140282 A1 | 7/2003 | Kaler | |
| 2003/0149659 A1 * | 8/2003 | Danaher et al. | 705/38 |
| 2003/0208402 A1 * | 11/2003 | Bibelnieks et al. | 705/14 |
| 2003/1208402 | 11/2003 | Bibelnieks et al. | |
| 2003/0233278 A1 * | 12/2003 | Marshall | 705/14 |
| 2004/0039548 A1 * | 2/2004 | Selby et al. | 702/179 |
| 2004/0054572 A1 * | 3/2004 | Oldale et al. | 705/10 |
| 2004/0073496 A1 | 4/2004 | Cohen | |
| 2004/0093296 A1 * | 5/2004 | Phelan et al. | 705/36 |
| 2004/0225566 A1 * | 11/2004 | Beyda et al. | 705/14 |
| 2005/0021397 A1 * | 1/2005 | Cui et al. | 705/14 |
| 2005/0065845 A1 * | 3/2005 | DeAngelis | 705/14 |
| 2005/0091077 A1 * | 4/2005 | Reynolds | 705/1 |
| 2005/0149419 A1 * | 7/2005 | Blumberg et al. | 705/35 |
| 2005/0273384 A1 * | 12/2005 | Fraser | 705/14 |
| 2006/0026067 A1 * | 2/2006 | Nicholas et al. | 705/14 |
| 2006/0122857 A1 * | 6/2006 | DeCotiis et al. | 705/1 |
| 2009/0018891 A1 * | 1/2009 | Eder | 705/10 |

FOREIGN PATENT DOCUMENTS

WO    WO 03093930 A2    11/2003

* cited by examiner

US 7,827,061 B2

DYNAMIC SELECTION OF OUTBOUND MARKETING EVENTS

BACKGROUND OF THE INVENTION

1. Technical Field

The present invention relates to a system and associated method for ordering outbound marketing events for offering to a candidate.

2. Related Art

Selling a plurality of services to a customer typically requires a complicated series of steps. Therefore there exists a need for a simple procedure to sell a plurality of services to a customer.

SUMMARY OF THE INVENTION

The present invention provides a database system, comprising:

a first database structure storing a first list identifying marketing events, wherein each marketing event from said first list comprises a marketing offer and an identified channel means for communicating said marketing offer;

a second database structure storing a second list of candidates; and a database manager software application stored on a computer readable medium, wherein said database manager software application comprises an optimization tool, and wherein said optimization tool is for optimizing and sorting, said marketing events from said first list with for a first candidate from said second list.

The present invention provides a selection method, comprising:

providing a database system comprising a database manager software application, a first database structure storing a first list identifying marketing events, and a second database structure storing a second list of candidates, wherein said database manager software application is stored on a computer readable medium, wherein said database manager software application comprises an optimization tool, and wherein each marketing event from said first list comprises a marketing offer and an identified channel means for communicating said marketing offer;

optimizing by said optimization tool, said marketing events from said first list for a first candidate from said second list; and sorting by said optimization tool, said marketing events from said first list for said first candidate from said second list.

The present invention provides a process for integrating computing infrastructure, comprising integrating computer-readable code into a computing system, wherein the code in combination with the computing system comprises database system comprising a database manager software application, a first database structure storing a first list identifying marketing events, and a second database structure storing a second list of candidates, wherein said database manager software application is stored on a computer readable medium, wherein said database manager software application comprises an optimization tool, and wherein each marketing event from said first list comprises a marketing offer and an identified channel means for communicating said marketing offer, and wherein the code in combination with the computing system is adapted to implement a method for performing the steps of:

optimizing by said optimization tool, said marketing events from said first list for a first candidate from said second list; and sorting by said optimization tool, said marketing events from said first list for said first candidate from said second list.

The present invention provides a computer program product, comprising a computer usable medium having a computer readable program code embodied therein, said computer readable program code comprising an algorithm adapted to implement a method for ordering a list identifying marketing events within a database system, said database system comprising a database manager software application, a first database structure storing a first list identifying marketing events, and a second database structure storing a second list of candidates, wherein said database manager software application is stored on a computer readable medium, wherein said database manager software application comprises an optimization tool, and wherein each marketing event from said first list comprises a marketing offer and an identified channel means for communicating said marketing offer, said method comprising the steps of:

optimizing by said optimization tool, said marketing events from said first list for a first candidate from said second list; and sorting by said optimization tool, said marketing events from said first list for said first candidate from said second list.

The present invention advantageously provides a system and associated method to implement a simple procedure to sell a plurality of services to a customer.

DETAILED DESCRIPTION OF THE INVENTION

Figure 1:
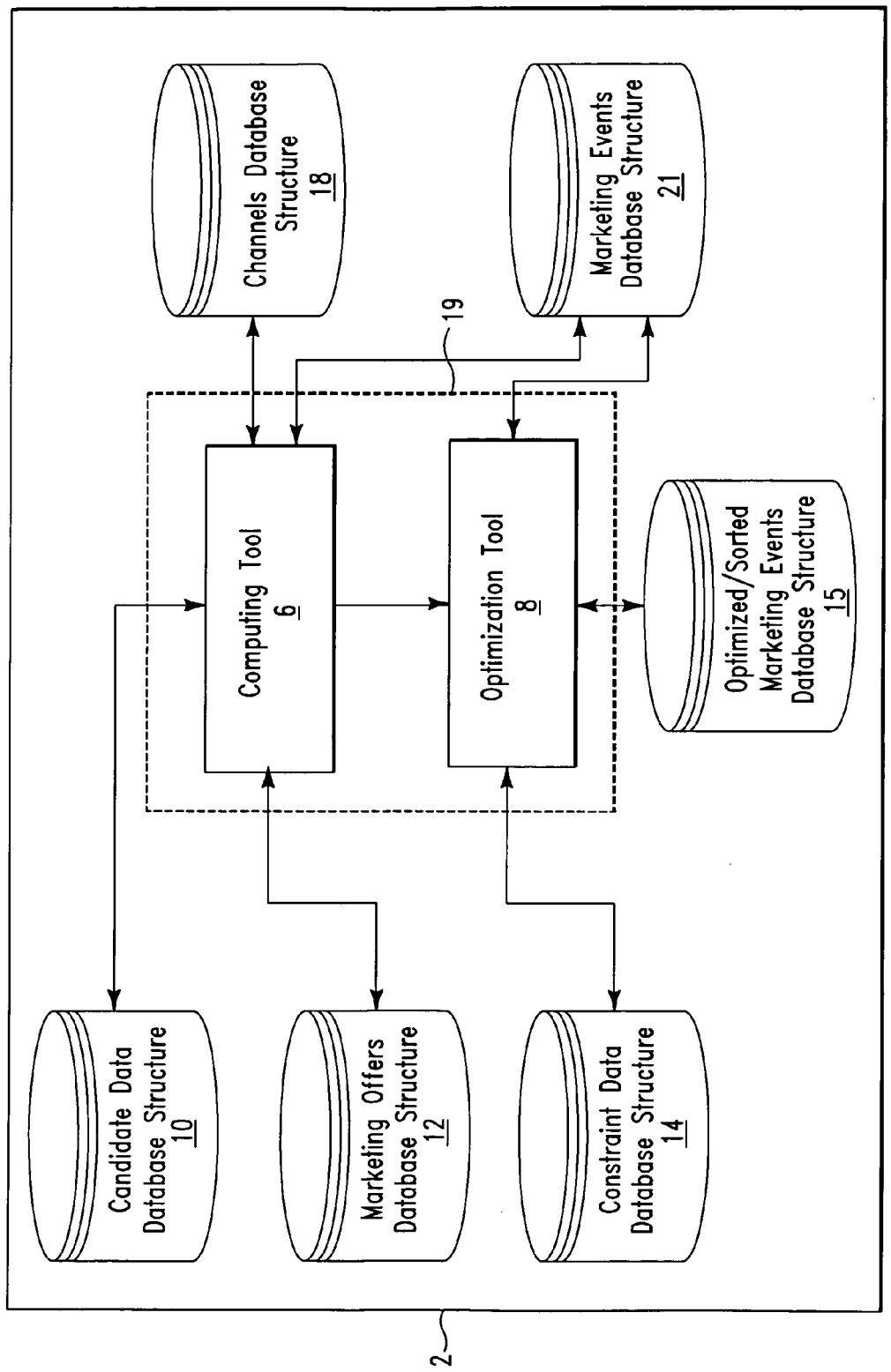
FIG. 1 illustrates a block diagram view of a database system for dynamically ordering a plurality of outbound marketing events for offering marketing offers to a candidate, in accordance with embodiments of the present invention.

FIG. 1 illustrates a block diagram view of a database system 2 for dynamically ordering a list identifying a plurality of outbound marketing events for offering marketing offers to a candidate, in accordance with embodiments of the present invention. Each marketing event from the list comprises a marketing offer and an identified channel means for communicating the marketing offers to a candidate. For example, a marketing event may comprise a 1.9% APR introductory interest rate for a 12 month period on a credit card, delivered to the candidate through direct mail. A marketing event may either comprise a growth (new marketing offer) marketing event or a retention (existing product like an existing credit card to be retained) marketing event. A marketing offer is defined herein as an offer from an entity (e.g., a business) for a product or service to be extended to a customer or potential customer (i.e., candidate). The product or service may comprise an incentive to entice the customer or potential customer to accept the offer. For example, the marketing offer may comprise a credit card offer that will provide an APR that is lower than the normal for a specified period of time as an incentive, such as, inter alia, 1.9% APR for the first 12 months if the credit card is accepted. A candidate may be an existing customer of the entity and a potential customer for the marketing offer. For example, an individual, a business, etc. A channel is a means to contact the candidate. For example, e-mail, direct mail, text message, telephone, etc. An outbound marketing event comprises a marketing event where an initial contact is made by an entity to offer the marketing event to a candidate. The database system 2 is used by an entity (e.g., a business such as a bank) comprising an existing customer database to sequentially order and optimize outbound marketing events (herein referred to marketing events) for offering to candidates from the existing customer database. The database system 2 comprises database structures 10, 12, 14, 15, 18, and 21 and a database manager software application 19. The database manager software application 19 is a single database manager software application (i.e., one software application as opposed to multiple software applications). The database manager software application 19 may comprise any type of database management software application including, inter alia, DB2 database management system by IBM, etc. The database manager software application 19 comprises a computing tool 6 and an optimization tool 8 (i.e., software components). Using a single database manager software application (i.e., database manager software application 19) comprising multiple software components (i.e., computing tool 6 and an optimization tool 8) is advantageous over using a plurality of individual database manager software applications (e.g., a first individual database manager software application comprising a computing tool and a second individual database manager software application comprising an optimization tool) because communications between components of single database manager software application (e.g., computing tool 6 and an optimization tool 8) are faster and more efficient than communications between multiple individual database manager software applications. Communications between components of a single database manager software application are faster and more efficient than communications between multiple individual database manager software applications because data (for manipulation) only has to be moved within a single software application and does not have to be moved from one software application to another software application. Therefore functions performed on the data (e.g., calculations, optimizations, etc) are performed faster and more efficiently by a single database manager software application than by multiple database manager software applications. Each of database structures 10, 12, 14, 15, 18, and 21 may be individual database structures within the database system 2. Alternatively, each of database structures 10, 12, 14, 15, 18, and 21 may be tables or sections within a single database structure (e.g., as illustrated in FIG. 1). Database structure 10 comprises customer (i.e., candidate) data including, inter alia, a list of candidates, data models using any customer past history data (e.g., credit card balances, past spending habits, etc.), etc. The customer (i.e., candidate) data comprises information about all of the entity's customers, current or prospective. This data may be compiled from any standard source including, inter alia, an existing marketing database containing data regarding active customers of the entity. The customer data primarily comprises behavioral data (e.g., purchasing history, returned-items history, payment history, etc), promotional (i.e., marketing events) history (e.g., past marketing events offered to a candidate including information regarding which marketing events were accepted by the candidate), and demographic data regarding the candidate. Database structure 10 additionally comprises a predetermined total budget for each candidate regarding an amount of money that the entity offering the marketing events is willing to spend to offer a plurality of marketing events to the candidate. Database structure 12 comprises the marketing offers. Database structure 12 additionally comprises a predetermined value score associated with each marketing offer. A value score is a numerical score (e.g., in dollars) representing an expected profit gain to be produced by a marketing offer from a candidate accepting and executing the marketing offer. Database structure 12 additionally comprises drop date data for each of the marketing offers. A drop date is an origin date for offering the marketing offer. Database structure 14 comprises constraint data regarding the marketing offer(s) as applied to a candidate. Constraint data comprises constraints that are associated with offering a marketing offer to a candidate. For example, constraint data may include, inter alia, an amount of money regarding execution costs for offering the marketing offer to a candidate (i.e., an amount that the entity has determined that they are willing is to spend to offer the marketing event to the candidate), a maximum number of offerings for a marketing event (e.g., how many times a marketing event is offered to a candidate), timing between offers, etc. Execution costs comprise costs associated with using each of the channels in the channels database structure 18. Execution costs may comprise, inter alia, costs for promotional materials, mailing costs, telemarketing costs, infrastructure costs, etc. Database structure 18 comprises data regarding channels that may be used to communicate the marketing offer to a candidate (e.g., e-mail, direct mail, text message, telephone, etc.). The computing tool 6 applies the data from database structure 18 to the marketing offers from database structure 12 to create a plurality of marketing events stored in database structure 21. The computing tool 6 uses data supplied from the database structures 10 and 12 to compute response probability scores and ranking scores for each of the marketing events from database structure 21 with respect to each of the candidates. The response probability scores are for determining a probability that a candidate(s) will respond to each of the marketing events. In other words, the response probability scores determine a probability that a candidate will respond to and accept a marketing event within a specified time frame. The response probability scores are calculated using the data models comprising any candidate past history data (e.g., credit card balances, past spending habits, etc.). The ranking score is computed as a function of a value score with respect to a response probability score (e.g., by multiplying a value score for a marketing event with a response probability score for a candidate). Each ranking score is associated with a marketing event for a specific candidate. The ranking scores are used to order the marketing events from highest rank to lowest rank to determine an order in which to offer the plurality of marketing events to the specific candidate. The optimization tool 8 sorts the ranking scores for the marketing events from database structure 21 (e.g., from highest rank to lowest rank) for the candidate and a ranking list is created. The optimization tool 8 uses data from the database structure 14 to apply constraint data (e.g., timing constraints, budget constraints, etc.) to each of the ranking scores on the ranking list for a candidate. The optimization tool 8 applies timing constraints to each of the ranking scores for each of the candidates. The timing constraints eliminate any marketing events that comprise timing conflicts between marketing events. For example, the optimization tool 8 will take the highest ranked marketing event (first marketing event) and compare it to the next highest ranked marketing event (second marketing event). If the two marketing events comprise a same type of marketing event (e.g., both marketing events comprise a credit card offer), then the optimization tool looks for a timing conflict. For example if the first marketing event is to be offered to the candidate every 30 days and the second marketing event is to be offered every 30 days then the second marketing event is eliminated from the ranking list because the two marketing events are same type of marketing event and should not be received by the candidate at the same time. The optimization tool 8 will continue to apply the timing constraints to each of the marketing events on the ranking list. Marketing events comprising timing conflicts are eliminated from the ranking list. The optimization tool 8 then applies monetary (i.e., budget) constraints to the value scores that remain on the ranking list and subtracts the monetary constraints from the predetermined budgeted execution costs for offering the marketing event to the candidate. The predetermined budgeted amount comprises an amount of money for execution costs that the entity has determined that they are willing is to spend to offer a plurality of marketing events to the candidate. For example, each time a marketing event is offered to a candidate, the execution costs are deducted from the budgeted amount, and once the budget is exceeded, the optimization tool 8 will eliminate any remaining marketing events from the ranking list. The final ranking list comprises marketing events that have not been eliminated and a specified order for offering the marketing events to the associated candidate. The final ranking list comprising the optimized and sorted marketing events is stored in the database structure 15.

Table 1 illustrates an example of sorted ranking scores with constraint data applied and subtracted from the budget.

TABLE 1

| Ranking score | Constraint data | Budget |
| --- | --- | --- |
| $50 | $10 | $30 |
| $40 | $5 | $20 |
| $30 | $10 | $15 |
| $20 | $5 | $5 |
| $10 | $10 | $0 |

The first row comprises the highest ranked marketing event ($50 rank). The total budget is $30 and the associated constraint data is $10. The constraint data ($10) is subtracted from the budget ($30) for the highest ranked marketing event leaving $20 in the budget for offering more marketing events to the candidate. The second row comprises the next ranked marketing event ($40 rank). The constraint data ($5) is subtracted from the budget ($20) for the next ranked marketing event ($40 rank) leaving $15 in the budget offering more marketing events to the candidate. The optimization tool goes through each ranked marketing event until there is no more money left in the budget (See row 5) thereby eliminating any more offerings for marketing events. The first four rows comprise the marketing events to be offered sequentially to the candidate. The fifth row comprises an eliminated marketing event due to an exhausted budget ($0).

An example of an implementation for the database system 2 of FIG. 1 for dynamically ordering marketing events for a candidate is described as follows. This example comprises six marketing offers and four channels.

Marketing Offers
1. A Mortgage Offer
2. A Credit Card offer
3. A Household insurance offer
4. An Auto insurance offer
5. A Platinum Credit Card
6. A low rate loan offer Channels
1. Mail
2. Email
3. Outbound telephone call
4. Text message The 6 marketing offers are multiplied by the 4 channels to produce 24 marketing events. Each marketing event comprises a drop date and therefore a calendar of events. A first candidate is scored for each of the 24 marketing events with propensity to respond (i.e., a response probability score) to each of the marketing events. All 24 response probability scores are calculated in parallel and each score comprises a range between 0 and 1 with 1 comprising the highest propensity to respond to a marketing event and 0 comprising the lowest propensity to respond to a marketing event. Each of the marketing events comprises an expected profit gain (i.e., value score). For example, if the marketing offer is a mortgage offer, the expected profit margin (i.e., value score) may be calculated based on an annual return of repayments vs. infrastructure costs balanced against the risk of the candidate defaulting on the mortgage vs. prepayment of mortgage before the term is up (although the mortgage may be loaded with a prepayment penalty clause to protect a revenue stream). A ranking score for each of the 24 marketing events is calculated as a function of a value score for each marketing event with respect to a response probability score for the associated marketing event with respect to the first candidate. The aforementioned process is performed by a computing tool (e.g., computing tool 6 in FIG. 1). An optimization tool (e.g., optimization tool 8 in FIG. 1) sorts the 24 marketing events from highest ranking scores to lowest ranking scores. The optimization tool applies constraint data including timing constraints and monetary constraints (i.e., verses budget) to the 24 marketing events. The constraint data is applied to the 24 marketing events starting with the highest ranked marketing event to the lowest ranking marketing event and ultimately an optimized execution list is produced comprising a stream of marketing events that the first candidate will receive. As an alternative, the marketing events may be ordered and optimized by the optimization tool 8 without using value scores, response probability scores, and ranking scores. Additionally, the marketing events may be ordered and optimized by the optimization tool 8 using any combination of the value scores, response probability scores, and ranking scores.

Figure 2:
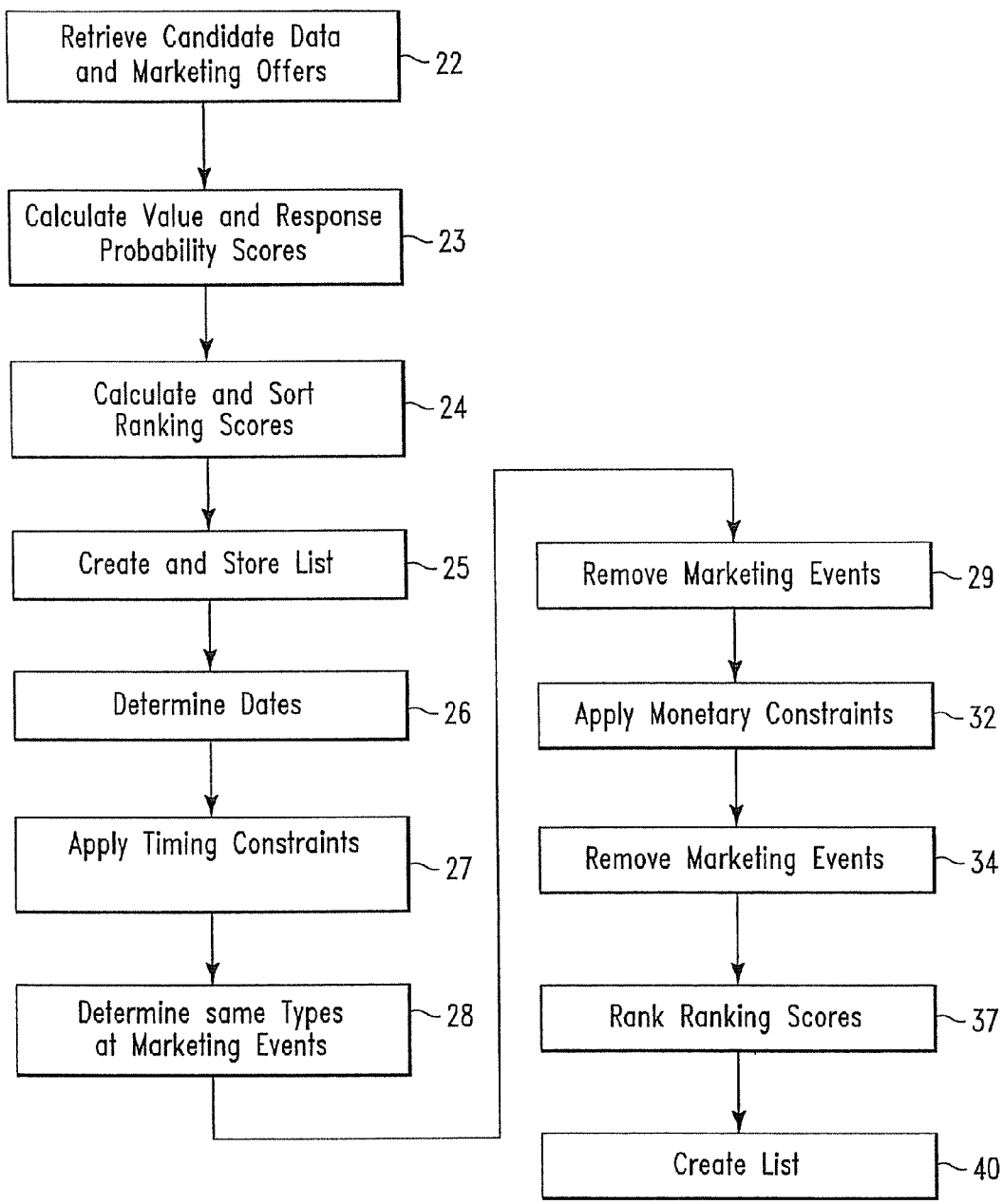
FIG. 2 illustrates a flowchart comprising an algorithm used by database system of FIG. 1 for dynamically ordering a plurality of outbound marketing events for offering to marketing offers to a candidate, in accordance with embodiments of the present invention.

FIG. 2 illustrates a flowchart comprising an algorithm used by database system 2 of FIG. 1 for dynamically ordering a plurality of marketing events for offering to a candidate, in accordance with embodiments of the present invention. In step 22, the computing tool 6 retrieves candidate data for a first candidate and marketing offers to offer to the first candidate and applies channel data to create a plurality of marketing events for the first candidate. In step 23, the computing tool 6 calculates value scores and response probability scores associated with the marketing events as described with respect to FIG. 1, supra. In step 24, ranking scores for the marketing events are calculated and sorted (i.e., the ranking scores for the marketing events are sorted from a highest rank to lowest rank for the first candidate) by the computing tool 6. The ranking scores are calculated by multiplying each value score with an associated response probability score as described with respect to FIG. 1, supra. In step 25, the optimization tool 8 generates and stores a ranking list. In step 26, the optimization tool 8 determines a date for offering each of the marketing events as described with respect to FIG. 1, supra. In step 27, the optimization tool 8 applies timing constraints to each of the ranking scores for the first candidate. The timing constraints eliminate any marketing events that comprise timing conflicts. In step 28, the optimization tool 8 determines if any of the marketing events comprise a same type of marketing offer as described with respect to FIG. 1, supra. In step 29, the optimization tool 8 removes any marketing events (i.e., based on results of step 27 and step 28) from the ranking list that comprise timing conflicts as described with respect to FIG. 1, supra. In step 32, the optimization tool 8 applies monetary constraints to the value scores that remain after the timing constraints have been applied and subtracts the monetary constraints from the predetermined budgeted execution costs for offering the marketing event to the first candidate. In step 34, the optimization tool 8 removes marketing events and associated ranking scores from the ranking list based on results of step 32 as described with respect to FIG. 1, supra. In step 37, the optimization tool 8 ranks any remaining ranking scores described with respect to FIG. 1, supra. In step 40, a final ranking list is created as a result of execution of steps 27, 28, 29, 32, 34, and 37. Note that steps 27, 28, 29, 32, 34, and 37 may be performed in any order. The final ranking list comprises marketing events that have not been eliminated (i.e., by timing and monetary constraints). The final ranking list comprises a specified order for offering the marketing events to the first candidate. Ranking a plurality of marketing events for the first candidate may be done in parallel. Additionally, ranking a plurality of marketing events for a plurality of candidates may be done in simultaneously in parallel.

Figure 3:
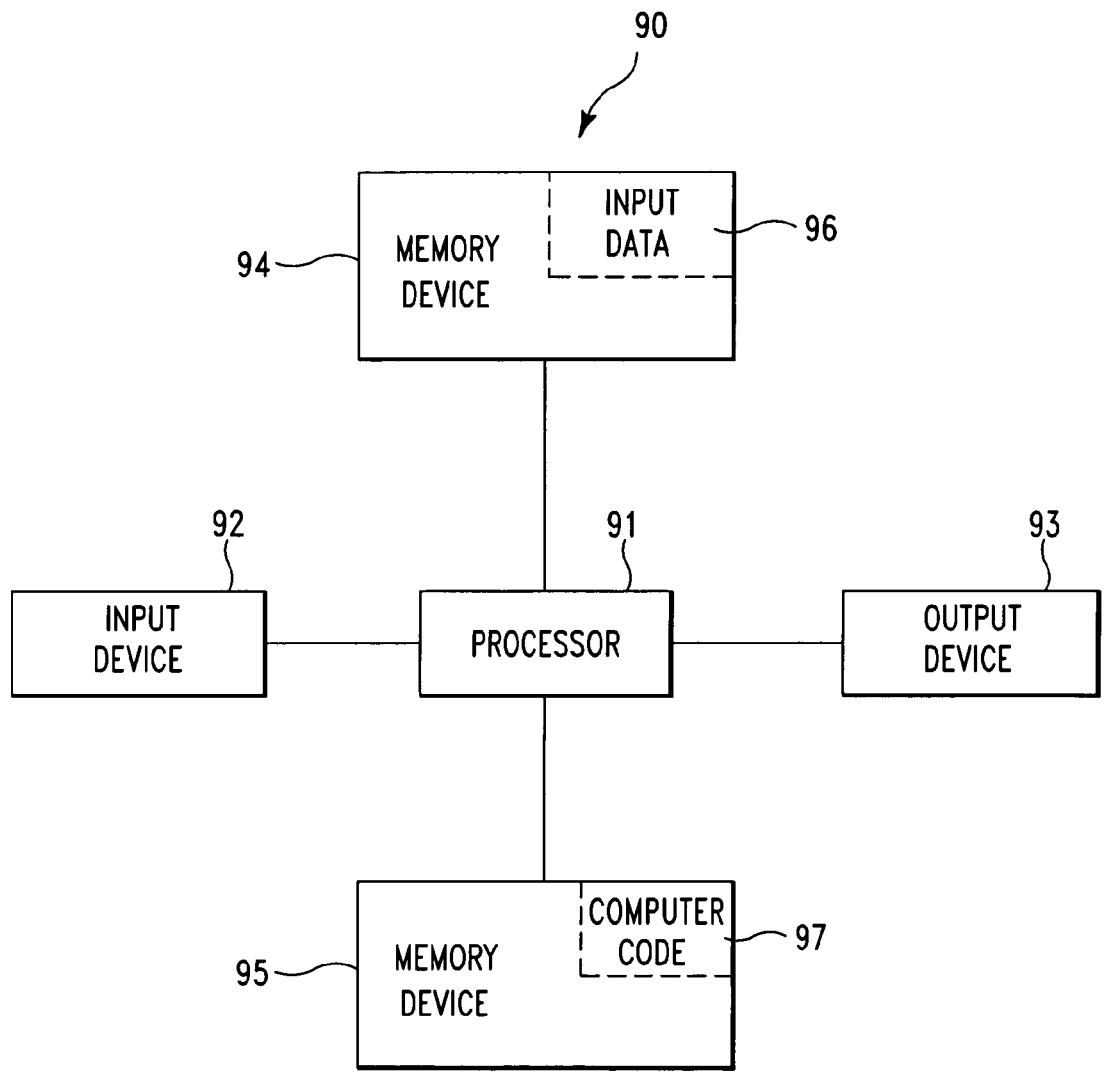
FIG. 3 illustrates a computer system used for implementing the database system for dynamically ordering a plurality of marketing events for offering marketing offers to a candidate, in accordance with embodiments of the present invention.

FIG. 3 illustrates a computer system 90 used for implementing the database system 2 of FIG. 1 for dynamically ordering a plurality of marketing events for offering to a candidate, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for dynamically ordering a plurality of marketing events for offering to a candidate. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the database system 2 of FIG. 1 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method used for dynamically ordering a plurality of marketing events for offering to a candidate.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A selection method, comprising:

providing a database system comprising a computer processor, a database manager software application, a first database structure storing a first list identifying marketing events, a second database structure storing a second list of candidates, and a third database structure storing a data model consisting of credit card balances, purchasing history, returned-items history, past marketing events that have been accepted by said candidates, and past spending habits associated with said second list of candidates, wherein said third database structure further comprises a predetermined total budget for said candidates regarding an amount of money that an entity offering said marketing events is willing to spend to offer said marketing events to the said candidates, wherein said database manager software application is stored on a computer readable medium, wherein said database manager software application comprises an optimization tool and a computing tool, and wherein each marketing event from said first list comprises a marketing offer associated with a credit based offer and an identified channel means for communicating said marketing offer;

calculating, by said computing tool, value scores associated with said marketing events from said first list, wherein each value score of said value scores is associated with a marketing event from said first list, wherein said value scores are associated with an expected profit gain associated with each said marketing offer, and wherein each said value score is calculated based on said data model, said predetermined total budget for said candidates, and an annual return of credit repayments vs infrastructure costs balanced against a risk of a candidate defaulting on said credit repayments;

computing by said computing tool, response probability scores for said marketing events from said first list for a first candidate from said second list, wherein each of said response probability scores are computed using said data model and said predetermined total budget, and wherein each of said response probability scores are computed simultaneously in parallel;

computing by said computing tool, ranking scores for said marketing events from said first list and said first candidate from said second list, wherein each ranking score for each of said marketing events from said first list is associated with said first candidate from said second list, and wherein each of said ranking scores are computed by multiplying each said response probability score with an associated value score of said third list;

sorting by said optimization tool for said first candidate, each said ranking score for each of said marketing events;

generating, by said computer processor in response to said sorting, a ranking list comprising a ranked version of said marketing events and said ranking scores;

determining, by said optimization tool, a date for offering each marketing event of said marketing events on said ranking list; and storing, by said database system, said ranking list;

applying, by said optimization tool, timing constraint data to each ranking score of said ranking scores, wherein said timing constraint data comprises timing related data associated with a maximum number of offerings for each said marketing event and timing between each said marketing offer of each said marketing event;

determining, by said optimization tool, if any of said marketing events comprises a same type of marketing offer;

removing, by said optimization tool in response to results of said applying said timing constraint data and results of said determining if any of said marketing events comprises a same type of marketing offer, a group of marketing events and associated ranking scores from said ranking list resulting in a second ranking list comprising first remaining marketing events and first remaining ranking scores, wherein said group of marketing events comprise marketing events comprising timing constraints specified by said timing constraint data;

applying, by said optimization tool, monetary constraint data to said first remaining value scores, wherein said monetary constraint data consists of an amount of money regarding execution costs associated with channels used for offering said remaining marketing events to said first candidate, wherein said execution costs consist of costs for promotional materials, mailing costs, telemarketing costs, and infrastructure costs, and wherein said applying said monetary constraint data comprises subtracting said monetary constraint data from said predetermined total budget;

removing, by said optimization tool in response to results of said applying said monetary constraint data, a second group of marketing events and associated ranking scores from said second ranking list resulting in a third ranking list comprising second remaining marketing events and second remaining ranking scores;

ranking in simultaneously in parallel, by said optimization tool, said second remaining ranking scores;

generating, by said computer processor in response to said ranking said second remaining ranking scores, a final ranking list comprising said second remaining marketing events of said marketing events and said second remaining ranking scores in a specified order resulting from said ranking.

2. The method of claim 1, further comprising generating by the optimization tool, a priority list comprising said marketing events, and wherein said priority list prioritizes an order in which to offer each of said marketing events to said first candidate.

3. The method of claim 1, further comprising generating by the optimization tool, a priority list comprising only a first group of marketing events from said marketing events that fall within a specified set of constraints, wherein said priority list prioritizes an order in which to offer each of said marketing events from said first group to said first candidate.

4. The method of claim 1, wherein said second list of candidates comprises existing customers of said entity that is offering said marketing events from said first list.

5. The method of claim 1, wherein said marketing events are sorted and optimized essentially simultaneously.

6. The method of claim 1, wherein each said marketing offer is selected from the group consisting of a product offer and a service offer.

7. The method of claim 1, wherein each identified channel means is selected from the group consisting of a telephone call, an email, a text message, and standard mail.

8. The method of claim 1, further comprising:
offering, by said computer system to first candidate, each said marketing event on said ranking list.

9. The method of claim 1, further comprising:
fourth determining, by said computer system, a plurality of channels for offering each said marketing event on said ranking list.

10. The method of claim 9, wherein said plurality of channels comprise a mail channel, an email channel, a telephone channel, and a text message channel.

11. A database system, comprising a computer processor coupled to a computer-readable memory unit, a database manager software application, a first database structure storing a first list identifying marketing events, a second database structure storing a second list of candidates, and a third database structure storing a data model consisting of credit card balances, purchasing history, returned-items history, past marketing events that have been accepted by said candidates, and past spending habits associated with said second list of candidates, wherein said third database structure further comprises a predetermined total budget for said candidates regarding an amount of money that an entity offering said marketing events is willing to spend to offer said marketing events to the said candidates, wherein said database manager software application is stored on said computer-readable memory unit, wherein said database manager software application comprises an optimization tool and a computing tool, and wherein each marketing event from said first list comprises a marketing offer associated with a credit based offer and an identified channel means for communicating said marketing offer, said memory unit comprising instructions that when executed by the computer processor implements a selection method, said method comprising:

calculating, by said computing tool, value scores associated with said marketing events from said first list, wherein each value score of said value scores is associated with a marketing event from said first list, wherein said value scores are associated with an expected profit gain associated with each said marketing offer, and wherein each said value score is calculated based on said data model, said predetermined total budget for said candidates, and an annual return of credit repayments vs infrastructure costs balanced against a risk of a candidate defaulting on said credit repayments;

computing by said computing tool, response probability scores for said marketing events from said first list for a first candidate from said second list, wherein each of said response probability scores are computed using said data model and said predetermined total budget, and wherein each of said response probability scores are computed simultaneously in parallel;

computing by said computing tool, ranking scores for said marketing events from said first list and said first candidate from said second list, wherein each ranking score for each of said marketing events from said first list is associated with said first candidate from said second list, and wherein each of said ranking scores are computed by multiplying each said response probability score with an associated value score of said third list;

sorting by said optimization tool for said first candidate, each said ranking score for each of said marketing events;

generating, by said computer processor in response to said sorting, a ranking list comprising a ranked version of said marketing events and said ranking scores;

determining, by said optimization tool, a date for offering each marketing event of said marketing events on said ranking list; and storing, by said database system, said ranking list;

applying, by said optimization tool, timing constraint data to each ranking score of said ranking scores, wherein said timing constraint data comprises timing related data associated with a maximum number of offerings for each said marketing event and timing between each said marketing offer of each said marketing event;

determining, by said optimization tool, if any of said marketing events comprises a same type of marketing offer;

removing, by said optimization tool in response to results of said applying said timing constraint data and results of said determining if any of said marketing events comprises a same type of marketing offer, a group of marketing events and associated ranking scores from said ranking list resulting in a second ranking list comprising first remaining marketing events and first remaining ranking scores, wherein said group of marketing events comprise marketing events comprising timing constraints specified by said timing constraint data;

applying, by said optimization tool, monetary constraint data to said first remaining value scores, wherein said monetary constraint data consists of an amount of money regarding execution costs associated with channels used for offering said remaining marketing events to said first candidate, wherein said execution costs consist of costs for promotional materials, mailing costs, telemarketing costs, and infrastructure costs, and wherein said applying said monetary constraint data comprises subtracting said monetary constraint data from said predetermined total budget;

removing, by said optimization tool in response to results of said applying said monetary constraint data, a second group of marketing events and associated ranking scores from said second ranking list resulting in a third ranking list comprising second remaining marketing events and second remaining ranking scores;

ranking in simultaneously in parallel, by said optimization tool, said second remaining ranking scores;

generating, by said computer processor in response to said ranking said second remaining ranking scores, a final ranking list comprising said second remaining marketing events of said marketing events and said second remaining ranking scores in a specified order resulting from said ranking.

12. The database system of claim 11, wherein said optimization tool is for generating a priority list comprising said marketing events, and wherein said priority list prioritizes an order in which to offer each of said marketing events from said first list to said first candidate.

13. The database system of claim 11, wherein said optimization tool is for generating a priority list comprising a first group of marketing events from said marketing events that fall within a specified set of constraints, and wherein said priority list prioritizes an order in which to offer each of said marketing events from said first group of marketing events to said first candidate.

14. The database system of claim 11, wherein said second list of candidates comprises existing customers of said entity that is offering said marketing events from said first list.

15. The database system of claim 11, wherein said marketing events are sorted and optimized essentially simultaneously.

16. The database system of claim 11, wherein each said marketing offer is selected from the group consisting of a product offer and a service offer.

17. The database system of claim 11, wherein each said identified channel means is selected from the group consisting of a telephone call, an email, a text message, and standard mail.

18. A process for integrating computing infrastructure, comprising integrating computer-readable code into a computing system, wherein the code in combination with the computing system comprises a database system comprising a database manager software application, a first database structure storing a first list identifying marketing events, a second database structure storing a second list of candidates, and a third database structure storing a data model consisting of credit card balances, purchasing history, returned-items history, past marketing events that have been accepted by said candidates, and past spending habits associated with said second list of candidates, wherein said third database structure further comprises a predetermined total budget for said candidates regarding an amount of money that an entity offering said marketing events is willing to spend to offer said marketing events to the said candidates, wherein said database manager software application is stored on a computer-readable memory unit, wherein said database manager software application comprises an optimization tool and a computing tool, and wherein each marketing event from said first list comprises a marketing offer associated with a credit based offer and an identified channel means for communicating said marketing offer, and wherein the code in combination with the computing system is adapted to implement a method for performing the steps of:

calculating, by said computing tool, value scores associated with said marketing events from said first list, wherein each value score of said value scores is associated with a marketing event from said first list, wherein said value scores are associated with an expected profit gain associated with each said marketing offer, and wherein each said value score is calculated based on said data model, said predetermined total budget for said candidates, and an annual return of credit repayments vs infrastructure costs balanced against a risk of a candidate defaulting on said credit repayments;

computing by said computing tool, response probability scores for said marketing events from said first list for a first candidate from said second list, wherein each of said response probability scores are computed using said data model and said predetermined total budget, and wherein each of said response probability scores are computed simultaneously in parallel;

computing by said computing tool, ranking scores for said marketing events from said first list and said first candidate from said second list, wherein each ranking score for each of said marketing events from said first list is associated with said first candidate from said second list, and wherein each of said ranking scores are computed by multiplying each said response probability score with an associated value score of said third list;

sorting by said optimization tool for said first candidate, each said ranking score for each of said marketing events;

generating, by said computer processor in response to said sorting, a ranking list comprising a ranked version of said marketing events and said ranking scores;

determining, by said optimization tool, a date for offering each marketing event of said marketing events on said ranking list; and storing, by said database system, said ranking list;

applying, by said optimization tool, timing constraint data to each ranking score of said ranking scores, wherein said timing constraint data comprises timing related data associated with a maximum number of offerings for each said marketing event and timing between each said marketing offer of each said marketing event;

determining, by said optimization tool, if any of said marketing events comprises a same type of marketing offer;

removing, by said optimization tool in response to results of said applying said timing constraint data and results of said determining if any of said marketing events comprises a same type of marketing offer, a group of marketing events and associated ranking scores from said ranking list resulting in a second ranking list comprising first remaining marketing events and first remaining ranking scores, wherein said group of marketing events comprise marketing events comprising timing constraints specified by said timing constraint data;

applying, by said optimization tool, monetary constraint data to said first remaining value scores, wherein said monetary constraint data consists of an amount of money regarding execution costs associated with channels used for offering said remaining marketing events to said first candidate, wherein said execution costs consist of costs for promotional materials, mailing costs, telemarketing costs, and infrastructure costs, and wherein said applying said monetary constraint data comprises subtracting said monetary constraint data from said predetermined total budget;

removing, by said optimization tool in response to results of said applying said monetary constraint data, a second group of marketing events and associated ranking scores from said second ranking list resulting in a third ranking list comprising second remaining marketing events and second remaining ranking scores;

ranking in simultaneously in parallel, by said optimization tool, said second remaining ranking scores;

generating, by said computer processor in response to said ranking said second remaining ranking scores, a final ranking list comprising said second remaining marketing event of said marketing events and said second remaining ranking scores in a specified order resulting from said ranking.

19. The process of claim 18, generating by the optimization tool, a priority list comprising said marketing events, and wherein said priority list prioritizes an order in which to offer each of said marketing events to said first candidate.

20. The process of claim 18, wherein said method further comprises generating by the optimization tool, a priority list comprising only a first group of marketing events from said marketing events that fall within a specified set of constraints, wherein said priority list prioritizes an order in which to offer each of said marketing events from said first group to said first candidate.

21. The process of claim 18, wherein said second list of candidates comprises existing customers of said entity that is offering said marketing events.

22. The process of claim 18, wherein said marketing events are sorted and optimized essentially simultaneously.

23. The process of claim 18, wherein each said marketing offer is selected from the group consisting of a product offer and a service offer.

24. The process of claim 18, wherein each said identified channel means is selected from the group consisting of a telephone call, an email, a text message, and standard mail.

25. A computer program product, comprising a computer usable medium having a computer readable program code embodied therein, said computer readable program code comprising an algorithm adapted to implement a method for ordering a list identifying marketing events within a database system, said database system comprising a database manager software application, a first database structure storing a first list identifying marketing events, a second database structure storing a second list of candidates, and a third database structure storing a data model consisting of credit card balances, purchasing history, returned-items history, past marketing events that have been accepted by said candidates, and past spending habits associated with said second list of candidates, wherein said third database structure further comprises a predetermined total budget for said candidates regarding an amount of money that an entity offering said marketing events is willing to spend to offer said marketing events to the said candidates, wherein said database manager software application is stored on a computer-readable memory unit, wherein said database manager software application comprises an optimization tool and a computing tool, and wherein each marketing event from said first list comprises a marketing offer associated with a credit based offer and an identified channel means for communicating said marketing offer, said method comprising the steps of:

calculating, by said computing tool, value scores associated with said marketing events from said first list, wherein each value score of said value scores is associated with a marketing event from said first list, wherein said value scores are associated with an expected profit gain associated with each said marketing offer, and wherein each said value score is calculated based on said data model, said predetermined total budget for said candidates, and an annual return of credit repayments vs infrastructure costs balanced against a risk of a candidate defaulting on said credit repayments;

computing by said computing tool, response probability scores for said marketing events from said first list for a first candidate from said second list, wherein each of said response probability scores are computed using said data model and said predetermined total budget, and wherein each of said response probability scores are computed simultaneously in parallel;

computing by said computing tool, ranking scores for said marketing events from said first list and said first candidate from said second list, wherein each ranking score for each of said marketing events from said first list is associated with said first candidate from said second list, and wherein each of said ranking scores are computed by multiplying each said response probability score with an associated value score of said third list;

sorting by said optimization tool for said first candidate, each said ranking score for each of said marketing events;

generating, by said computer processor in response to said sorting, a ranking list comprising a ranked version of said marketing events and said ranking scores;

determining, by said optimization tool, a date for offering each marketing event of said marketing events on said ranking list; and storing, by said database system, said ranking list;

applying, by said optimization tool, timing constraint data to each ranking score of said ranking scores, wherein said timing constraint data comprises timing related data associated with a maximum number of offerings for each said marketing event and timing between each said marketing offer of each said marketing event;

determining, by said optimization tool, if any of said marketing events comprises a same type of marketing offer;

removing, by said optimization tool in response to results of said applying said timing constraint data and results of said determining if any of said marketing events comprises a same type of marketing offer, a group of marketing events and associated ranking scores from said ranking list resulting in a second ranking list comprising first remaining marketing events and first remaining ranking scores, wherein said group of marketing events comprise marketing events comprising timing constraints specified by said timing constraint data;

applying, by said optimization tool, monetary constraint data to said first remaining value scores, wherein said monetary constraint data consists of an amount of money regarding execution costs associated with channels used for offering said remaining marketing events to said first candidate, wherein said execution costs consist of costs for promotional materials, mailing costs, telemarketing costs, and infrastructure costs, and wherein said applying said monetary constraint data comprises subtracting said monetary constraint data from said predetermined total budget;

removing, by said optimization tool in response to results of said applying said monetary constraint data, a second group of marketing events and associated ranking scores from said second ranking list resulting in a third ranking list comprising second remaining marketing events and second remaining ranking scores;

ranking in simultaneously in parallel, by said optimization tool, said second remaining ranking scores;

generating, by said computer processor in response to said ranking said second remaining ranking scores, a final ranking list comprising said second remaining marketing events of said marketing events and said second remaining ranking scores in a specified order resulting from said ranking.

26. The computer program product of claim 25, generating by the optimization tool, a priority list comprising said marketing events, and wherein said priority list prioritizes an order in which to offer each of said marketing events to said first candidate.

27. The computer program product of claim 25, wherein said method further comprises generating by the optimization tool, a priority list comprising only a first group of marketing events from said marketing events that fall within a specified set of constraints, wherein said priority list prioritizes an order in which to offer each of said marketing events from said first group to said first candidate.

28. The computer program product of claim 25, wherein said second list of candidates comprises existing customers of said entity that is offering said marketing events.

29. The computer program product of claim 25, wherein each of said ranking scores are computed essentially simultaneously.

30. The computer program product of claim 25, wherein each said marketing offer is selected from the group consisting of a product offer and a service offer.

31. The computer program product of claim 25, wherein each said identified channel means is selected from the group consisting of a telephone call, an email, a text message, and standard mail.

* * * * *